United States Patent
Olsson et al.

(10) Patent No.: US 9,535,714 B2
(45) Date of Patent: Jan. 3, 2017

(54) AUTOMATIC DETECTION AND RECONFIGURATION OF DEVICES

(71) Applicants: Steve E. Olsson, Camano Island, WA (US); Sundararajan Aravamudhan, Bangalore (IN); Prathibha Kundavaram, Hyderabad (IN); Rajat Talwar, Gurgaon (IN); Kiran Kumar Chava, Khammam (IN); Dennis Scott Batchelder, Bellevue, WA (US)

(72) Inventors: Steve E. Olsson, Camano Island, WA (US); Sundararajan Aravamudhan, Bangalore (IN); Prathibha Kundavaram, Hyderabad (IN); Rajat Talwar, Gurgaon (IN); Kiran Kumar Chava, Khammam (IN); Dennis Scott Batchelder, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 213 days.

(21) Appl. No.: 13/760,174

(22) Filed: Feb. 6, 2013

(65) Prior Publication Data

US 2013/0148165 A1   Jun. 13, 2013

Related U.S. Application Data

(63) Continuation of application No. 12/141,068, filed on Jun. 17, 2008, now Pat. No. 8,380,827.

(51) Int. Cl.

| | |
|---|---|
| G06F 15/177 | (2006.01) |
| G06F 9/44 | (2006.01) |
| H04L 12/24 | (2006.01) |
| H04L 29/06 | (2006.01) |
| G06F 3/06 | (2006.01) |
| G06F 3/12 | (2006.01) |

(52) U.S. Cl.
CPC ........... *G06F 9/4411* (2013.01); *G06F 3/1297* (2013.01); *H04L 41/0816* (2013.01); *H04L 41/12* (2013.01); *H04L 63/101* (2013.01); *H04L 63/20* (2013.01); *G06F 3/0607* (2013.01); *G06F 3/067* (2013.01); *G06F 3/0632* (2013.01); *G06F 3/0637* (2013.01); *G06F 3/1293* (2013.01); *H04L 41/082* (2013.01)

(58) Field of Classification Search
CPC .......................... H04L 41/0813; H04L 41/0816
USPC ........................................................ 709/221
See application file for complete search history.

(56) References Cited

U.S. PATENT DOCUMENTS

| | | | |
|---|---|---|---|
| 6,263,387 B1 | 7/2001 | Chrabaszcz | |
| 6,745,147 B2 | 6/2004 | Ahrens et al. | |
| 7,146,260 B2 | 12/2006 | Preston et al. | |
| 7,152,099 B1 | 12/2006 | Arens | |
| 7,287,257 B2 | 10/2007 | Meza | |
| 7,664,839 B1* | 2/2010 | Karr et al. | 709/223 |
| 2001/0019559 A1 | 9/2001 | Handler et al. | |
| 2003/0018805 A1* | 1/2003 | Meyerson | 709/237 |
| 2003/0088652 A1 | 5/2003 | Takahashi | |
| 2003/0115298 A1* | 6/2003 | Baker | 709/220 |
| 2003/0233541 A1* | 12/2003 | Fowler et al. | 713/155 |
| 2004/0210649 A1 | 10/2004 | Bhogal et al. | |
| 2004/0210897 A1 | 10/2004 | Brockway et al. | |
| 2004/0215816 A1 | 10/2004 | Hayes et al. | |
| 2005/0108369 A1 | 5/2005 | Sather et al. | |
| 2005/0114507 A1 | 5/2005 | Tarui et al. | |
| 2005/0138179 A1* | 6/2005 | Encarnacion et al. | 709/227 |
| 2006/0047793 A1 | 3/2006 | Agrawal et al. | |
| 2006/0101459 A1 | 5/2006 | Crosier et al. | |
| 2006/0212629 A1* | 9/2006 | Suzuki | G06F 9/4411 710/104 |
| 2006/0280439 A1 | 12/2006 | Ukai et al. | |
| 2007/0124513 A1* | 5/2007 | Kikuchi | G06F 8/62 710/8 |
| 2007/0234354 A1* | 10/2007 | Hattori | G06F 3/1204 717/177 |
| 2008/0162675 A1 | 7/2008 | Bolay et al. | |
| 2012/0162687 A1* | 6/2012 | Hattori | G06F 3/1204 358/1.13 |

OTHER PUBLICATIONS

"Device Expert", 2006, Networks Unlimited, 4 pages.
"Zenoss Core Product Overview", 2005-2008, Zenoss, Inc., 8 pages.
"Alterpoint Enhances Network Configuration Management Solution", Mar. 1, 2004, AlterPoint, Inc., 4 pages.
W. Kieth Edwards, "Discovery Systems in Ubiquitous Computing", Published by the IEEE CS and IEEE ComSoc, 2006, 8 pages.

* cited by examiner

*Primary Examiner* — Brian P Whipple
(74) *Attorney, Agent, or Firm* — Kate Drakos; Micky Minhas

(57) ABSTRACT

Described is a technology by which movement of a shared network device (e.g., a printer or storage device) to a different network machine triggers an automatic reconfiguration of the device and/or the network machines, so that those machines remain able to share that device. Configuration data may be pushed to the network machines, pulled by the network machines, and/or provided to a server by which the network machines may access the confirmation data. Reconfiguration may include creating a system user account and modifying the permissions associated with the device so that the other machine has access permission to use the device via the created account.

20 Claims, 4 Drawing Sheets

AUTOMATIC DETECTION AND RECONFIGURATION OF DEVICES

BACKGROUND

At present, many homes and businesses have a small network of computer systems (machines) with various peripheral devices coupled to the computer systems. A network administrator can configure the peripheral devices for sharing, e.g., through shares, a one computer system can print or read/write data via a printer or disk that is physically coupled to another computer system.

However, a problem with the current method of device sharing arises when such a peripheral device is moved to a different machine. When this happens, the user needs to reconfigure all of the machines in the network that need to use the shared device, based on its new location. This task becomes more difficult as the number of machines increases; indeed, configuring the device is often very cumbersome, sometimes requiring the installation of drivers for a printer or storage device on the machine to which the device is moved, and requiring reconfiguration of other machines in the network. Further, this is becoming a common problem because many types of peripheral devices are highly portable, e.g., typically requiring only power and a USB or IEEE 1394 interface (e.g., FireWire or I.link) coupling to move to a new machine.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which movement of a network device (e.g., a printer or storage device) to a different machine is detected, triggering an automatic reconfiguration of the device and at least one other machine in the network to share that device. In one aspect, reconfiguration includes creating a system user account and modifying the permissions associated with a device (resource) object that represents the shared device so that the other machine has access permission to use the device via the created account. For example, the shared device may be a central backup device, with access control lists associated with directories corresponding to backup folders on the central backup device modified to allow the other machine access to those folders.

In one example implementation, the other machine is configured to use the device by pushing configuration data (e.g., access credentials and new location information about the device) to the other machine. Alternatively, or in addition to, the configuration data may be provided (e.g., pushed to or pulled from) a configuration server, via which the other machine may obtain the configuration data for reconfiguration.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards detecting the change in a connection of a peripheral device from one computing machine (machine) to another computing machine in a network, and automatically reconfiguring the other machines in the network to access the peripheral device at its new location. In general, the detection and reconfiguration is automatic and transparent to the user; (although one or more simple prompts may be used, this is still considered automatic and transparent). Note that as used herein, "connect" and "couple" in any of their various forms generally refer to being capable of communicating locally or over a network, regardless of whether direct communication, or indirect communication through any number of one or more intermediaries.

While some of the examples described herein are directed towards movement of a printer, or a disk drive such as a central backup device, it is understood that these are only examples. For example, any network device that is accessed through one machine but may be moved to another in a manner that requires network reconfiguration, such as a VoIP telephone, may benefit from the technology described herein. Further, while device "movement" is described, it is understood that a newly-added device may be configured and have network machines configured to use it.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
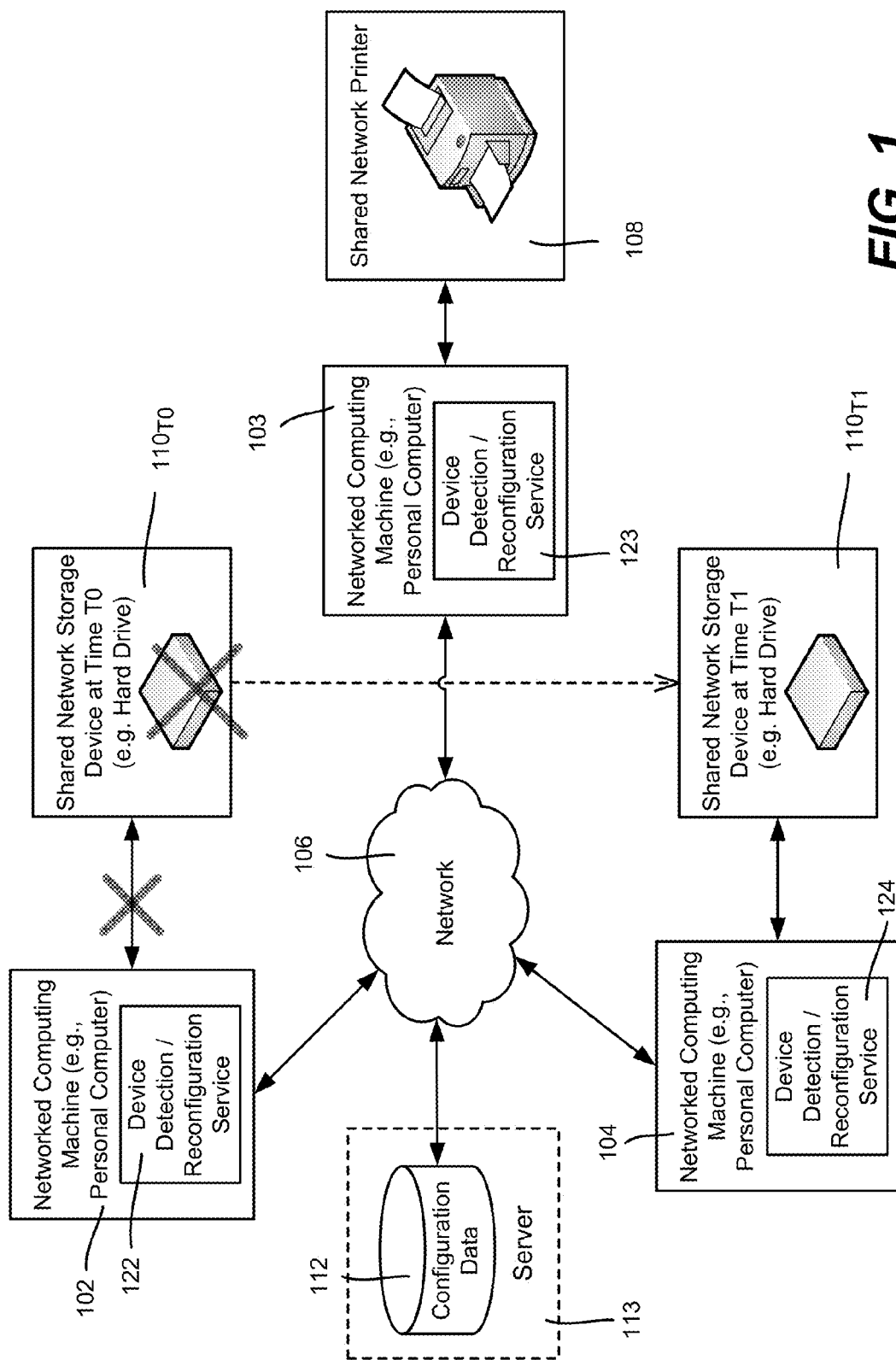
FIG. 1 is a block diagram representing an example network in which peripheral devices may move from one machine to another.

Turning to FIG. 1, there is shown a number of computing machines 102-104 (any practical number may be present) coupled to one another via a network 106. Example computing machines include personal computers to which peripheral devices are connected. The network may communicate over any communication means, wired and/or wireless.

As also represented in FIG. 1, the networked computing machines 102-104 are connected to peripheral devices, which in this example include a printer 108 and a hard disk drive, such as used as a central backup device. As is known, each such device is represented by a device (resource) object that is maintained in the machine to which it is connected, such as for determining who has permission to use the device, as described below. Note that although not shown in the example of FIG. 1, multiple peripheral devices of the same type (e.g., multiple printers and/or hard drives) may be present in a network arrangement, with any movement thereof capable of being handled by the technology described herein.

Further note that in FIG. 1, a single hard disk drive is shown as two instances thereof, e.g., each instance coupled to a different computing machine at different times, and are thus labeled as a hard drive $110_{T0}$ at a first time/location (machine 102) time and the same hard drive $110_{T1}$ at a second time/location (machine 104). The earlier hard drive $110_{T0}$ instance and its communications link to the machine 102 are shown in FIG. 1 as being crossed out, to indicate the disconnection from the computing machine 102, followed by the later movement (the dashed arrow) and reconnection of the later instance of the hard drive $110_{T1}$ to the machine 104.

FIG. 1 also shows configuration data 112, which may be accessed (such as through a server 113) by the various computing machines 102-104 to obtain the information needed to use the peripheral devices, (the printer 108 and hard disk drive $110_{T0}$ or $110_{T1}$ in this example), regardless of where they are located. As described below, this configuration data 112 may be updated whenever a peripheral device is moved, and/or also communicated to each active computing machine. Note that in FIG. 1, the configuration data 112 is shown as a separate data store coupled to the network 106, such as via the server 113, and indeed in one implementation is maintained at an Internet server location such that any computing machine 102-104 coupled to the Internet can access the configuration data 112 when needed, such as at startup, regardless of which other computing machine or machines may be operating. However, in other alternatives, the configuration data 112 may be maintained on one of the computing machines acting as the server 113 (e.g., on a shared disk), and/or replicated to any of the others. The server 113 is thus shown as a dashed box to indicate its various possible locations.

In general, the computing machines behave intelligently in that each is arranged to detect the movement of any peripheral device once reconnected to a machine, (e.g., as detected via plug-and-play technology, which also may install any needed software on the newly-connected machine). Once detected, the mechanisms described herein configure the other active machines in the network to operate with the peripheral device at its changed location, e.g., via data communication and/or changing the configuration data 112.

Reconfiguration is thus very straightforward from the user's perspective, e.g., it occurs automatically upon reconnecting the peripheral device to a different computing machine. Note that the user may be prompted to determine whether the configuration change is desired, for example to inquire whether the device movement is not just temporary but permanent (or at least semi-permanent) such that the user will be using the device from other computers. If so, the settings are changed in response, including (when applicable) generating a security mechanism in the machine which is automatically and transparently pushed to the other machines in the network.

To accomplish the automatic and transparent reconfiguration, in one implementation a device detection/reconfiguration service runs at each machine and detects the movement of the device; in FIG. 1 the services 122-124 run on the machines 102-104, respectively. For example, the device detection/reconfiguration service 124 running in the machine 104 may detect the new device arrival at a USB or IEEE1394 port, identify the device, determine whether it is an existing shared device, and if so, reconfigure the device and/or the network machines for network access as described herein.

In one implementation, upon detection of a device connection to a machine, that machine's movement service prompts whether the user wants to perform the reconfiguration, e.g., by asking whether the user intended to "permanently" move the device to this machine. If so, the service configures the device, and broadcasts the configuration information to other machines in the network, e.g., those subscribed for such information (not all machines in a network need be subscribed to use a shared device), such as by providing the configuration data (e.g., including credentials) and the like in a push communication. Thereafter, applications and the like simply use the device at its new location, without network users (necessarily) being aware of the change.

In addition to any push communication, the configuration data 112 is updated. As a result, any machines that are not communicating at the time of the broadcast, and thus do not receive any such information, can be configured to use the shared device by accessing the configuration data 112, such as at startup or reconnection to the network. In this manner, such other machines may now work with the device at its new location. It should be noted that an alternative to pushing the configuration data to machines that are communicating, it is alternatively feasible to simply update the configuration data 112 and notify those communicating machines to fetch the data from the server 113, such as in the background or on demand, or have the server 113 perform the push operation.

Turning to security aspects, authentication is often required to access network shared devices. In one example implementation, user-based authentication may be employed. To this end, a system user is created corresponding to each machine, such as with a random password. This user and password are provided to that machine directly, e.g., through the local area network or through a server.

Whenever a machine tries to use the peripheral device as a resource, that machine needs to provide the username and password. Note that such a system user obtains access only to the resource corresponding to that machine, whereby in some scenarios, such as backup, even an administrator-level user of a machine may not have access. Validity of the user accounts may also be enforced, e.g., such that at regular intervals, the system user and password are regenerated and pushed to the machines automatically and transparently, providing a robust and secure security solution.

Figure 2:
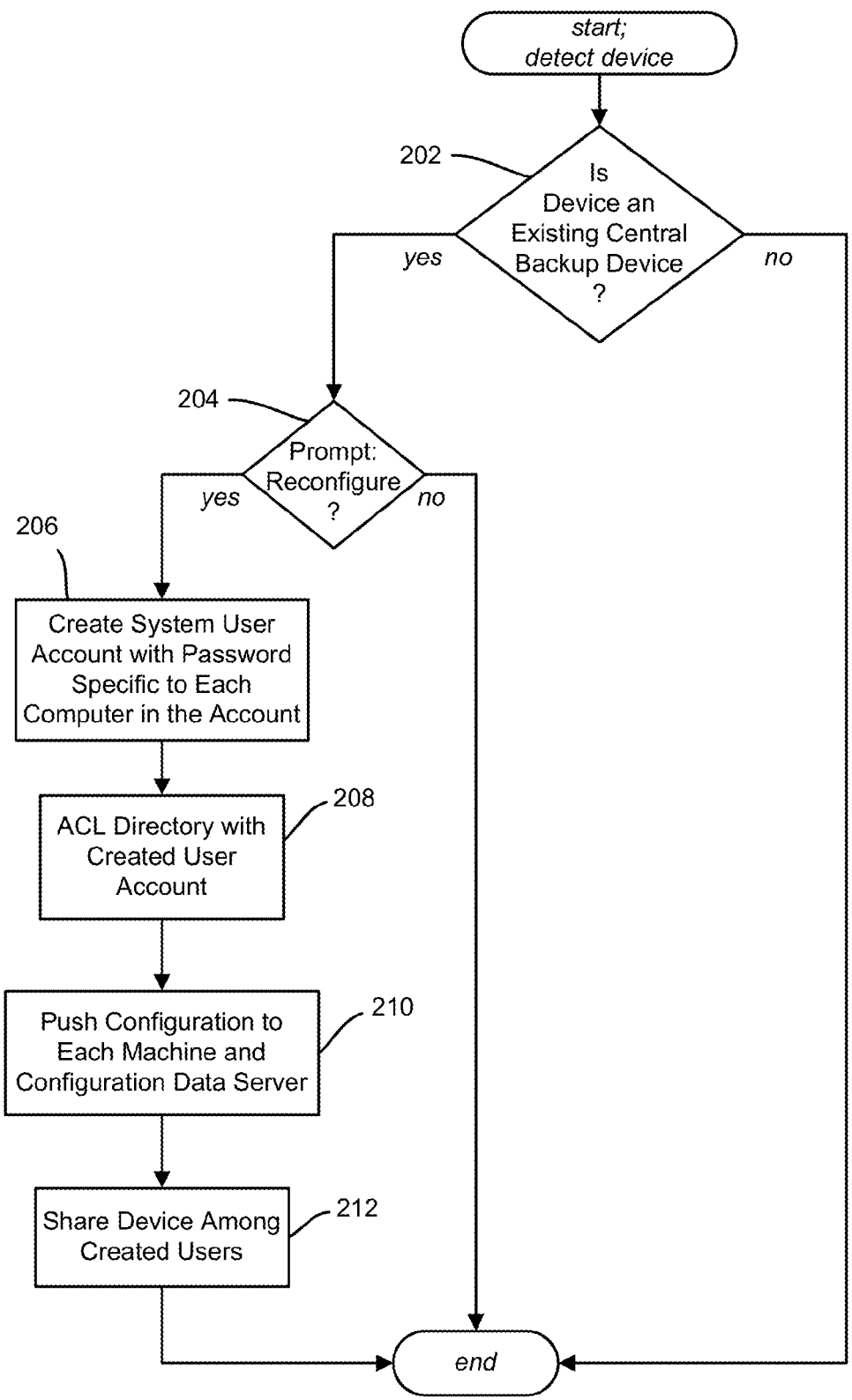
FIG. 2 is a flow diagram showing example steps taken to automatically reconfigure machines to use a shared central backup device when detecting movement of that central backup device from one machine to another in a network.

By way of example, FIG. 2 is a flow diagram representing example steps in one implementation for accomplishing centralized backup of subscribed (registered) machines. In this example, the subscription owner has the authority to configure backups for all subscribed computers (clients), and push the configuration settings out to those clients. The clients are configured to perform the backups over the network to one or more common target storage devices (disk drives).

As represented in FIG. 2 via step 202, the service running in a machine to which a device is reconnected detects the arrival of storage media, and determines that the media is a central backup device. Note that if not a central backup device, the process ends in this example, although other types of shared devices may be detected and trigger one or more similar processes being executed, (e.g., instead of ending, step 202 may branch to the printer handling process at step 302 of FIG. 3).

When step 202 detects a central backup device, at step 204 the service provides a dialog indicating that the central backup device has been moved to this machine, prompting the user as to whether reconfiguration is desired. If the user responds with a "Yes" answer or the like, the device is reconfigured to use the new machine for central backup, and the information is pushed to other machines in the subscription.

To reconfigure, at step 206 a system user and share password is created for each machine in the subscription. At step 208, these newly-created system users are given permission to write to the backup folders. For example, in a Windows®-based operating system, the directories are "ACLed" with the users' accounts created against the corresponding folders, that is, the access control lists associated with the directories are updated with the data identifying the system user accounts data. In one example implementation, the share and user information are pushed (step 210) to the other machines, e.g., through secure RPC (remote procedure call), and to the server 113 that maintains and provides access to the configuration data 112. As described above, any subscribed machine not coupled to the network and/or turned off at this time will get the configuration from the configuration data server 113 when it is re-coupled to the network. Step 212 represents the sharing of the device for the created users.

Figure 3:
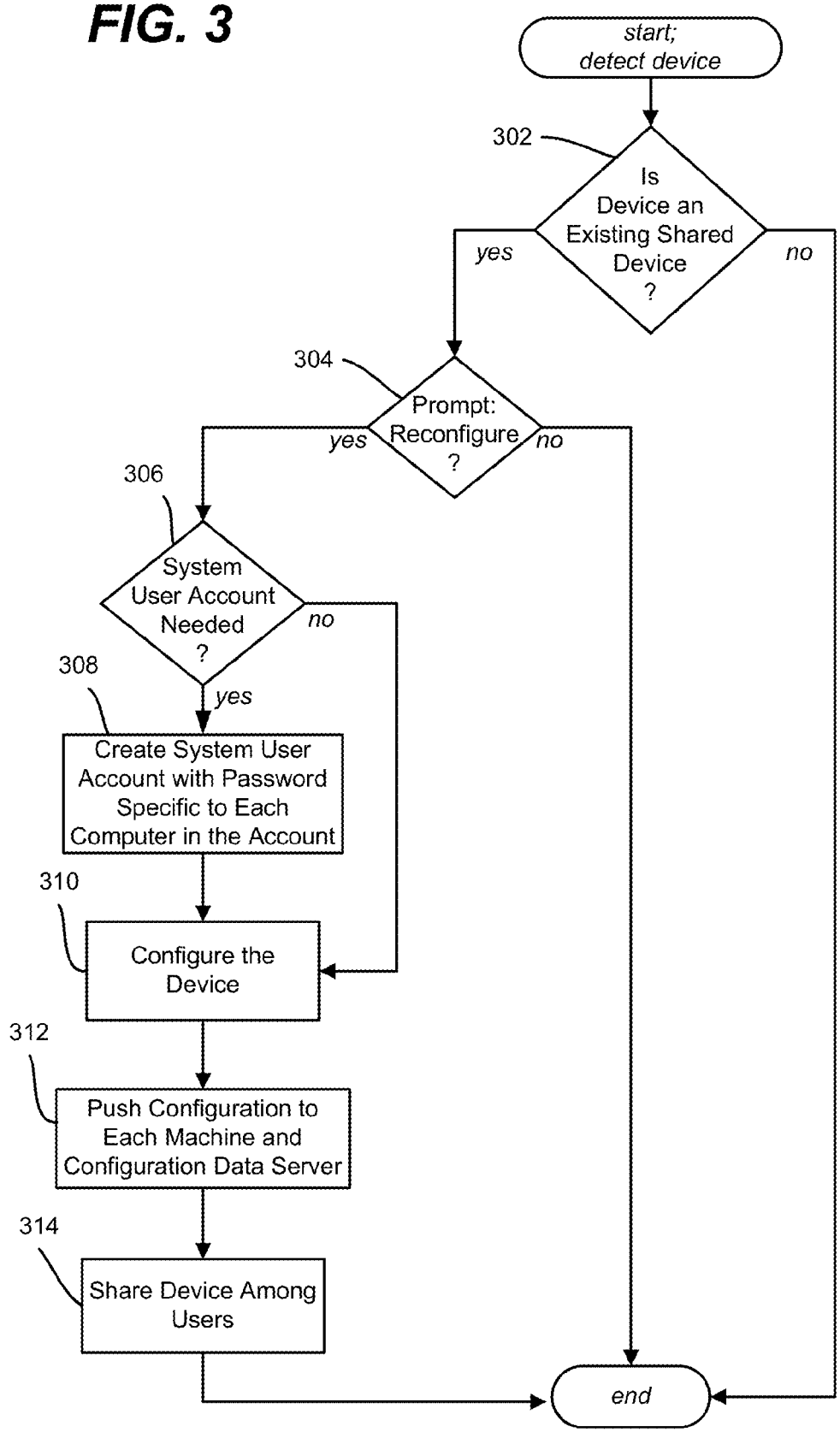
FIG. 3 is a flow diagram showing example steps taken to automatically reconfigure machines to use a shared device (e.g., a printer) when detecting movement of that shared device from one machine to another in a network.

FIG. 3 shows a generally similar example flow diagram for movement of a shared device, such as a shared printer in this particular example. At step 302, the service that is running in a machine to which the device is reconnected detects the movement and evaluates whether the device is of a type that is shared by subscribed machines. If so, step 304 provides a prompt/dialog indicating that the shared device has moved to this machine, asking the user whether to reconfigure the device and network machines for sharing.

If the user responds with "Yes" or the like, the service creates the share for the printer and publishes it across the subscription. To this end, if a system user account is needed (step 306), the service generates the system user and share for each machine in the subscription (step 308). Step 310 configures the device for any new shares and user accounts created, e.g., modifies the ACLs associated with the device (resource) object that represents that device to allow access by the subscribed machines.

Step 312 pushes (e.g., via secure RPC) the configuration data to other machines, including the device's new location, so that the other machines can now access the device. As before, the configuration data 112 is also updated at the configuration data server 113 so that any machine is not coupled to the network or turned off at this time can get the configuration data when it comes back. Step 314 represents the sharing of the device for the users.

As can be seen, there is provided the detection of device movement between network machines, resulting in automatic reconfiguration, including for handling authentication and/or for pushing the information to individual machines in a network. Reconfiguration may include creating system users corresponding to individual machines, and setting permissions (e.g., revising the ACL) of the respective device resource for those created users.

Exemplary Operating Environment

Figure 4:
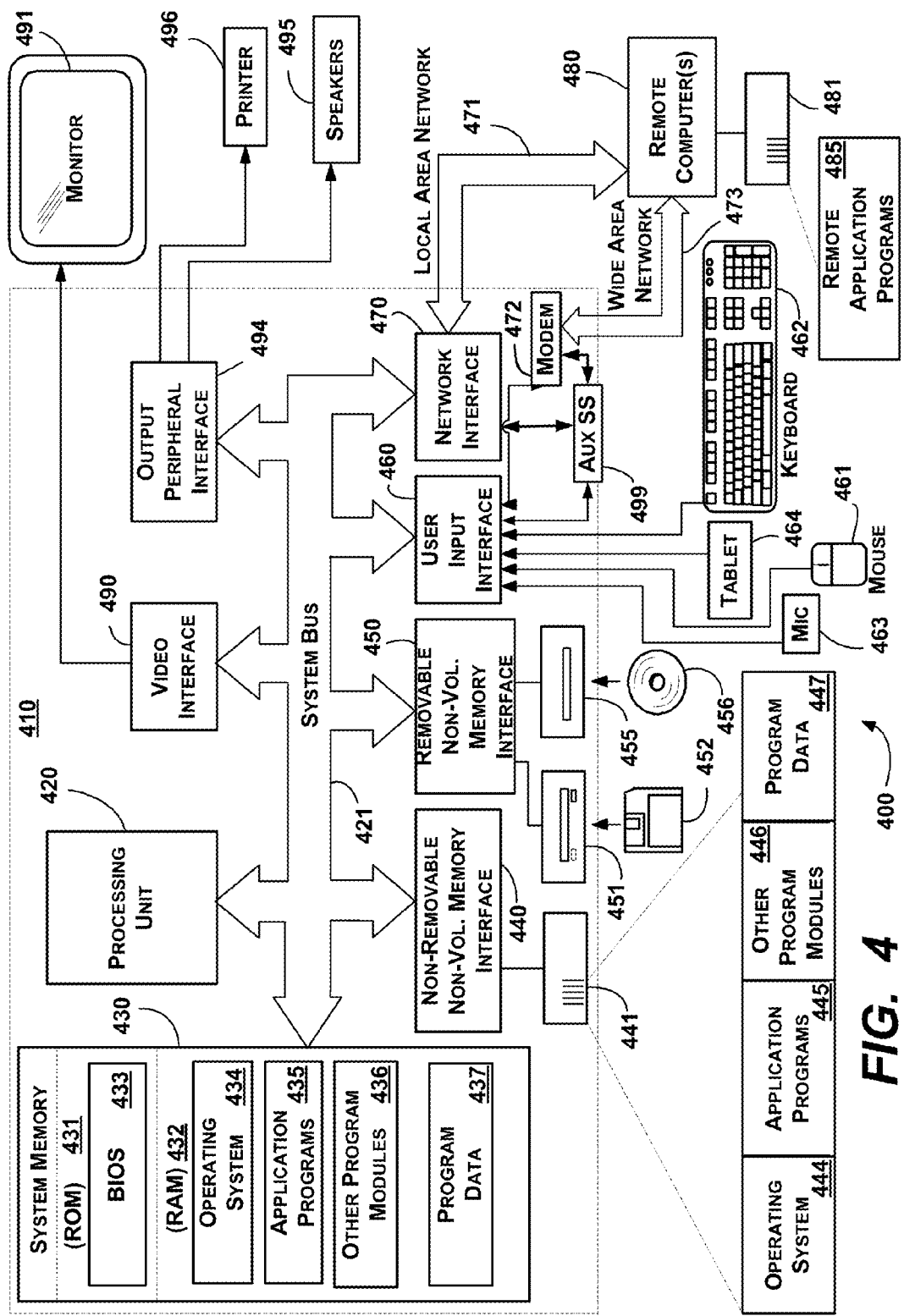
FIG. 4 shows an illustrative example of a computing environment into which various aspects of the present invention may be incorporated.

FIG. 4 illustrates an example of a suitable computing and networking environment 400 into which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing machine in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing machine 410 is incorporated, such as in a tablet-type personal computer. In addition, computers such as the computing machine 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer networking environment, a method employing at least one processor to perform operations comprising:

determining that a device that had a previous connection to a first machine of a network is now connecting to a second machine;

obtaining configuration data related to the previous connection; and configuring at least one other machine that is different from the second machine and is not presently running on the network to use the device through the second machine when the at least one other machine is later running on the network, the configuring based at least in part on the configuration data related to the previous connection.

2. The method of claim 1, wherein determining that the device that had the previous connection to the first machine of the network further comprises detecting a connection of the device to a universal serial bus (USB) or Institute of Electrical and Electronics Engineers (IEEE) 1394 interface of the second machine.

3. The method of claim 1 wherein configuring the device comprises changing access permissions associated with a device object representative of the device.

4. The method of claim 1 wherein configuring the device comprises determining whether the device is an existing shared device, and responsive to a determination that the device is an existing shared device, configuring the device for network access.

5. The method of claim 1 further comprising:
configuring the at least one other machine, including creating a system user account that has access permissions to use the device, and providing data corresponding to that system user account to the at least one other machine.

6. The method of claim 5 wherein configuring the at least one other machine comprises changing access permissions associated with a device object representative of the device to allow access via the system user account.

7. The method of claim 5 wherein configuring the at least one other machine comprises providing configuration data to the at least one other machine.

8. The method of claim 1 further comprising:
providing the configuration data to a configuration data server.

9. The method of claim 5 wherein configuring the at least one other machine comprises obtaining the configuration data from a configuration data server.

10. The method of claim 1 wherein configuring the device or the at least one other machine that is different from the second machine, or both, comprises prompting a user as to whether to reconfigure, and responsive to the user selecting to reconfigure, operating a reconfiguration process.

11. In a computer network environment, a system comprising:
a memory, wherein the memory comprises computer useable program code;
one or more processing units, wherein the one or more processing units execute the computer useable program code to implement a device detection service, implemented on the one or more processing units, that determines that a device has been previously connected to a first machine of a network, detects a connection of the device to a second machine of the network, obtains configuration data related to a previous connection to the first machine, and configures the device to be shared by at least one other machine of the network that is different from the second machine and is not currently running in the network when the at least one other machine later is running in the network, the configuring based at least in part on the configuration data related to the previous connection.

12. The system of claim 11 wherein the device detection service further configures the at least one other machine, including by providing configuration data to the at least one other machine.

13. The system of claim 11 wherein the device detection service further changes access permissions associated with a device object representative of the device when configuring the device to be shared by the at least one other machine.

14. The system of claim 11 wherein the device comprises a central backup device.

15. The system of claim 11 wherein the device comprises a printer.

16. The system of claim 11 wherein the service is further configured to provide the configuration data to a configuration data server.

17. One or more computer storage devices having computer-executable instructions stored thereon, which in response to execution by a computer, cause the computer to perform operations comprising:
detecting a connection of a device to a first machine;
determining that the device is a device shared by a quantity of machines in a network environment;
obtaining configuration data related to a previous connection of the device to a second machine in the network environment; and
configuring the device to allow access by the quantity of machines, including at least one other machine that is not currently running in the network environment, the configuring based at least in part on the obtained configuration data related to the previous connection.

18. The one or more computer storage devices of claim 17 further comprising:
creating a system user account for the at least one other machine that is different from the first machine;
communicating at least a subset of the configuration data related to the previous connection including data representative of the created system user account; and
modifying access permissions associated with the device to allow access to the device via the system user account, based at least in part on the configuration data related to the previous connection.

19. The one or more computer storage devices of claim 17 further comprising:
providing at least part of the configuration data related to the previous connection to a configuration data server.

20. The one or more computer storage devices of claim 17 further comprising:
publishing a share across the number of subscribed machines in the network environment.

* * * * *